(12) United States Patent
Zimmer et al.

(10) Patent No.: US 7,421,533 B2
(45) Date of Patent: Sep. 2, 2008

(54) METHOD TO MANAGE MEMORY IN A PLATFORM WITH VIRTUAL MACHINES

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 10/827,763

(22) Filed: Apr. 19, 2004

(65) Prior Publication Data

US 2005/0235123 A1  Oct. 20, 2005

(51) Int. Cl.
*G06F 12/00* (2006.01)
*G06F 21/00* (2006.01)

(52) U.S. Cl. .................... 711/6; 711/170; 711/171; 711/173; 711/202; 711/203; 711/209; 718/104; 718/105; 718/108

(58) Field of Classification Search ......... 711/170–173, 711/6, 202–203, 209; 707/205, 206; 718/104–105, 718/108
See application file for complete search history.

(56) References Cited

U.S. PATENT DOCUMENTS

| 5,544,349 | A | * | 8/1996 | Berry et al. ................. 711/165 |
| 6,075,938 | A | * | 6/2000 | Bugnion et al. ............... 703/27 |
| 6,263,421 | B1 | * | 7/2001 | Anderson .................... 712/209 |
| 6,647,508 | B2 | * | 11/2003 | Zalewski et al. ............... 714/3 |
| 6,785,886 | B1 | * | 8/2004 | Lim et al. ..................... 718/1 |
| 6,880,022 | B1 | * | 4/2005 | Waldspurger et al. .......... 710/9 |
| 6,970,902 | B1 | * | 11/2005 | Moon ......................... 709/201 |
| 2004/0078631 | A1 | * | 4/2004 | Rogers et al. .................. 714/5 |
| 2004/0230794 | A1 | * | 11/2004 | England et al. ............. 713/164 |
| 2005/0091365 | A1 | * | 4/2005 | Lowell et al. ............... 709/224 |
| 2005/0138370 | A1 | * | 6/2005 | Goud et al. ................. 713/164 |
| 2005/0268071 | A1 | * | 12/2005 | Blandy et al. ............... 711/208 |

* cited by examiner

*Primary Examiner*—Sanjiv Shah
*Assistant Examiner*—Yaima Campos
(74) *Attorney, Agent, or Firm*—Joni D. Stulman-Horn

(57) ABSTRACT

An embodiment of the present invention enables the virtualizing of virtual memory in a virtual machine environment within a virtual machine monitor (VMM). Memory required for direct memory access (DMA) for device drivers, for example, is pinned by the VMM and prevented from being swapped out. The VMM may dynamically allocated memory resources to various virtual machines running in the platform. Other embodiments may be described and claimed.

28 Claims, 3 Drawing Sheets

METHOD TO MANAGE MEMORY IN A PLATFORM WITH VIRTUAL MACHINES

FIELD OF THE INVENTION

An embodiment of the present invention relates generally to managing memory and, more specifically, to virtualizing virtual memory in a virtual machine environment within a virtual machine monitor.

BACKGROUND INFORMATION

Various mechanisms exist for managing memory in a virtual machine environment. A virtual machine platform typically executes an underlying layer of software called a virtual machine monitor (VMM) which hosts one to many operating system (OS) sessions, also known as virtual mactines (VMs). In existing systems, a VMM controls resources on the virtualization platform, including memory. The VMM takes the amount of physical memory on the platform, i.e. 256 MB or other total, and apportions it (divides it up) among the many. OSs that are hosted in the various VMs. For instance, if the virtual machine session supports Linux and Microsoft® Windows® running simultaneously, and has a total of 256 MB physical available memory, the VMM divides the available total in half for each session. In this example, both Windows® and Linux will each have 128 MB available. Other proportions may be predetermined for the platform. Thus, a priori decision will be made on memory allocation and resource reservation.

A problem with this method is the inability to dynamically create and delete VM sessions efficiently, regarding the use of available physical memory resources. In one example, two VM sessions grows to eight VM sessions and then back to two. In this scenario, the memory must be divided up for the maximum number of sessions, i.e., eight. Thus, when only two sessions are running, ¾ of the available memory is idle and unused. The allocation cannot be changed dynamically, or on the fly.

An operating system (OS) may distinguish between user mode and kernel mode. The OS also has a notion of privileged pages and pageable (swappable) vs. non-pageable (non-swappable) memory. In normal operation of existing systems, some memory is not available for swapping. This is often due to device drivers using specific memory for buffer space. In a virtual environment, the guest OS runs in a VM with knowledge of memory that has been allocated to the guest OS. The guest OS also has knowledge of buffer space required for various device drivers. In a virtual environment of an existing system, virtualization of VM memory is not possible by a virtual machine monitor because some pages are non-swappable. In existing systems, only the guest OS knows which pages are non-swappable and thus, only the guest OS may perform virtual memory operations. The VMMs of existing systems will not be able to accommodate memory that is not available for swapping, with respect to the guest VM OS. The VMM of existing systems allocates physical memory to the guest OS and the OS keeps track of non-swappable areas.

BRIEF DESCRIPTION OF THE DRAWINGS

The features and advantages of the present invention will become apparent from the following detailed description of the present invention in which.

DETAILED DESCRIPTION

Figure 1:
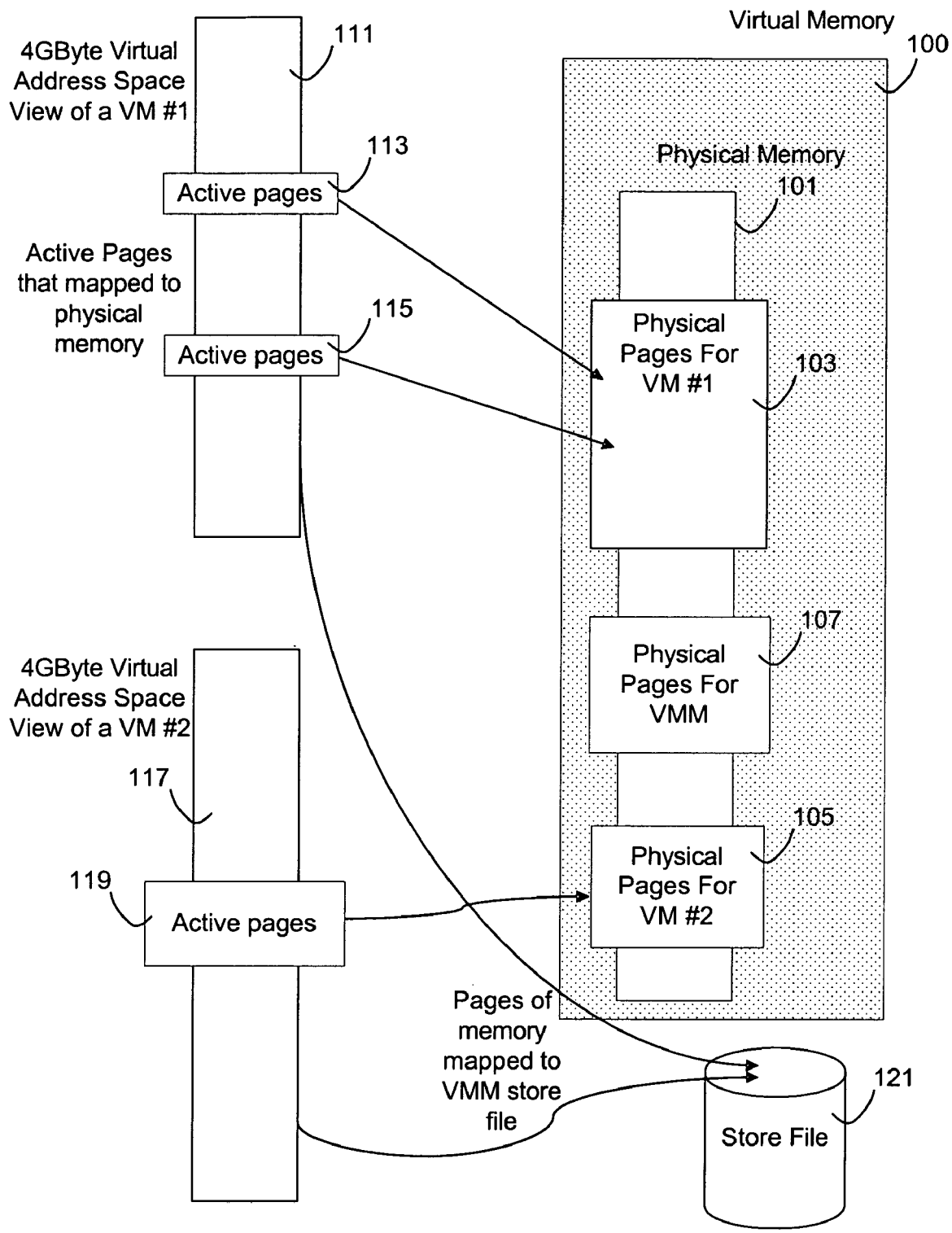
FIG. 1 is a block diagram illustrating virtualization of memory in a virtual machine with respect to physical memory, according to an embodiment of the invention.

An embodiment of the present invention is a system and method relating to managing memory in a virtualization platform by a virtual machine monitor (VMM). In at least one embodiment, the present invention is intended to allow dynamic allocation of memory to one or more virtual machines running on a virtual machine platform.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In existing systems, the VMM does not know what the guest OS is doing with the memory allocated to the guest OS. Thus, the VMM cannot guarantee that non-swappable pages are not swapped out, in virtual memory schemes. Direct memory access (DMA) of memory buffers, for instance, used by device drivers, causes existing VMMs to give up control of virtual memory management to the guest OS, since the guest OS knows which memory locations are needed for the device DMA, but the VMM does not. An embodiment of the present invention addresses this problem by indicating that areas of memory requiring DMA are non-swappable.

For instance, if the guest OS has directed an input/output (I/O) controller to perform a direct memory access (DMA) from the peripheral component interconnect (PCI) bus to a selected page, then the page must be swapped in and be marked as non-swappable. The memory page needs to be resident in order to receive DMA-based transactions. In existing systems, the VMM would be unaware that this memory area needed to be swapped in. Thus, if the I/O device writes directly to this area of memory and it is being used by another VM, the contents could be corrupted.

Thus, in existing systems, physical memory may not be reallocated among VMs dynamically. On the other hand, the guest OS knows when memory is used as direct memory access (DMA) and cannot be page swapped. User mode application memory may be treated as virtual memory and be swapped in and out. This memory may be stored on a disk until a user application accesses it. Swapping unused, or not recently used, memory pages to a non-volatile storage device is well known in the art. However, the agent that controls swapping must be aware of non-swappable areas.

An embodiment of the present invention creates a second level of memory abstraction to enable the VMM to dynamically reallocate memory among the VMs while ensuring that DMA memory remains pinned to a specific guest OS and marked as non-swappable. The guest OS knows which of the allocated memory is non-swappable and the VMM knows which physical memory has been assigned to the VM (guest OS).

The VMM defines a level of abstraction of a memory partition. In other words, if two partitions of physical memory are generated from the allocated physical memory, the VMM makes it appear to each of two guest OSs that their memory allocation begins at address zero. In reality, the guest OSs will be assigned a portion of physical memory according to the defined partitions. In existing systems, the VMM uses one-stage mapping, i.e., maps the virtual address known by the guest OS to physical memory, with no swapping. In one example, there is 256 MB of physical memory partitioned to two guest VMs, each OS in a guest VM has a prescribed, or virtual, 0-128 MB address space. In one example, Windows® runs in one VM and Linux runs in a second VM. The Linux OS may actually be assigned physical memory in address range 128-256 MB, but it appears to Linux that the Linux OS is using memory in the virtual address range 0-128 MB. The VMM maps the virtual memory address to the physical memory address. In this scenario, the VMM applies a fixed offset translation from virtual address range 0-128 MB to physical address range 0-128 MB or 128-256 MB. An embodiment of the present invention enables the VMM to more fully manage virtual memory among guest VMs, including reallocation of partitions.

Referring now to the drawings, and in particular to FIG. 1, there is shown a block diagram illustrating virtualization of memory in a virtual machine with respect to physical memory, according to an embodiment of the invention. In an exemplary embodiment, physical memory 101 has physical pages of memory allocated to a first VM 103, a second VM 105, and the VMM 107. A first VM has virtual address space 111 with active pages 113 and 115. The active pages 113 and 115 are mapped to pages in the physical memory 103. A second VM has virtual memory 117 with active pages 119. The active pages 119 are mapped to pages in the physical memory 105. In an embodiment of the invention, inactive pages may be stored in a store file 121 to free up pages in physical memory for re-allocation among the VMs.

In one embodiment, the VMM performs virtualization of memory in a similar fashion to non-virtualization environments. However, DMA is handled specially. In an embodiment, DMA memory access is handled via a virtual machine call (VM_Call) method. In some embodiments, when a guest OS needs to access a DMA page, a VM_Call is made which causes an exit from the VM context and a switch to the VMM context of the platform. The VMM may then handle the access.

The VMM controls the available physical memory 103, 105, and 107, and creates a virtual range of memory 100 that may be larger than the amount of physical memory 101. When an access is attempted to a region of memory where there is not a physical backing page of memory, the VMM uses its own backing store such as a VMM store file (121).

In one example, both Linux (VM 1) and Windows® (VM 2) OSs are running as guest OSs in VMs on a virtualization platform. Suppose Linux shuts down. In existing systems, the memory 111 dedicated to Linux is wasted and remains unused. In embodiments of the disclosed system and method, Windows® may gain access to some or all of the virtual memory 111 and 117, including the memory previously dedicated to Linux 111. In one embodiment, the VMM is aware that Linux has shut down and dynamically repartitions the physical memory, allocating memory previously used by Linux to other guest OSs. In another embodiment, the newly available memory is left alone, initially. Eventually, the VMM memory management agent realizes that this memory has not been used for some time and automatically swaps the unused memory to the store file 121. The swapped memory then becomes available to be used, or reclaimed, by other VMs that are executing under the VMM control.

The VMM may perform compression and/or encryption on the swapped pages to economize on the amount of page file space needed in the store file 121. In some embodiments it is desirable to encrypt the swap files to ensure that the data of one VM is inaccessible to other VMs or other systems. In an embodiment, the VMM virtualization is transparent to the OS, so the guest OS does not know that its memory is being virtualized. A guest OS may keep encryption keying materials and other secure items in memory. Thus, if that memory is virtualized, the data must be kept secure from other guest OSs. Further, the guest OS information may remain in non-volatile memory after the machine is turned off. Thus, if the swap files are encrypted, unauthorized access may be prevented.

In existing systems, the VMM does not page swap or virtualize memory. It merely performs a translation from the address used by the OS to a physical address. The VMM provides isolation and address translation of memory. Thus, in existing systems, a guest OS cannot access the memory of another guest OS. DMA, however, does not subscribe to a VMM policy. Devices will write to assigned DMA memory locations at their own whim. Thus, these areas must be protected from swapping. In one embodiment of the present invention, the VMM is to be notified of DMA areas so the OS pinning and swapping policies are not violated and to protect memory used for DMA by a guest VM OS. By keeping track of areas needed for DMA, the VMM will not swap these non-swappable regions of memory while performing resource management and virtual memory addressing.

Figure 2:
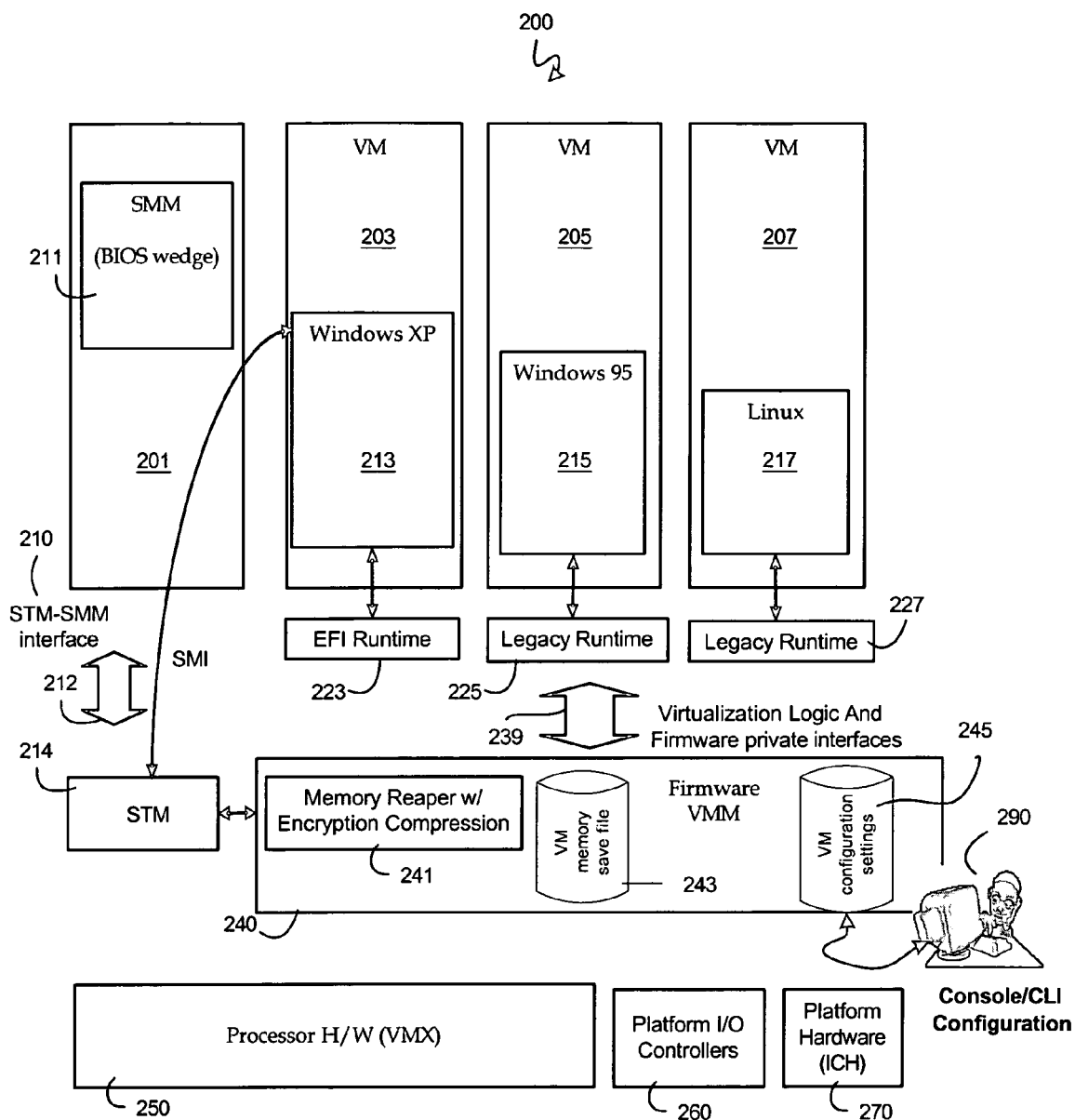
FIG. 2 is a block diagram illustrating a virtual machine platform and its corresponding virtual machines and virtual machine monitor utilizing memory virtualization, according to an embodiment of the invention.

Now referring to FIG. 2, there is shown an exemplary virtualization platform 200 and its corresponding virtual machines (VMs) and virtual machine monitor (VMM) utilizing memory virtualization, according to embodiments of the invention. In an exemplary embodiment, a virtualization platform 200 may have a system management memory (SMM) process 211 running in a special virtual machine 201. This example shows three guest VMs 203, 205, 207 running three guest operating systems 213, 215, 217, respectively. In this example, guest VM 203 is running Windows® XP (213), guest VM 205 is running Windows® 95 (215), and guest VM 207 is running Linux (217) operating system (OSs).

In some embodiments of platforms having a processor support for virtualization capability 250, original equipment manufacturer (OEM) SMM 211 is like a wedge of basic input output system (BIOS) code that comes from the platform. In other words, SMM is a subset of the BIOS code that comes from the platform flash memory. The SMM component is typically built into the main BIOS flash image and may be loaded into SMRAM by the main BIOS during Power-On Self Test (POST). In order to effect the isolation properties for some platform security models, the SMM 211 code runs in a VM 201 during runtime. This policy may be used for both a shrink wrapped OS and an OEM SMM. The OEM SMM may be technically a guest VM, but it may have special properties.

A system management interrupt (SMI) transfer monitor (STM-SMM) interface 210 may collaborate with the VMM 240 for the SMM 211 policies. The STM is an optional monitor for hosting the OEM SMM code. The OEM SMM may send messages to the STM regarding requests to access certain memory pages, etc. Garbage collecting, or reaping unused SMM memory, may be omitted by the SMM 211 because not much memory is typically used in the SMM process. On the other hand, since the SMM is technically a class of guest, SMM memory may be managed in the same manner as the other guests.

OEMs may choose to implement their own code in the SMI transfer monitor (STM) 214 rather than allowing this function to be a part of the VMM 240. The STM 214 may support the same policy as the main virtual machine monitor. In this example, the only guest that the STM 214 needs to control is the SMM 211. The STM executes when a SMI event 212 occurs, which may be when a signal is sent via a pin when an interrupt occurs, or another type of interprocessor interrupt.

The VMM 240 typically creates all guest VMs 203, 205, 207 other than the OEM SMM 201. The VMM 240 controls platform resources including controlling the execution of the various VMs. In virtualization platforms 250, a VM_Exit call transitions processing to the VMM 240 from VM execution. A VM_Exit may occur at various times while the processor is under VM control, and is used specifically to pass execution control to the VMM. This transfer, or context switch, may be initiated by the VM, or execute automatically like an interrupt or trap.

A variety of VMM software/firmware 240 may be utilized. Although in FIG. 2, the VMM is labeled "firmware" VMM 240, it will be apparent to one of ordinary skill in the art that embodiments of the present system and method may be implemented in software, as well as, hardware, firmware, or a combination. The VMM need not be launched from firmware, but this may be preferable by the OEM, in order for them to control the ownership of the platform and the capability. The VMM may be launched like an OS, or as an EFI driver. In some embodiments, the VMM may be launched first, from the bare hardware, before the guest VMs are loaded.

One job of the VMM is to give the guest OS the impression that the guest OS is booting from the bare hardware. The guest OSs 213, 215, 217 run in VMs 203, 205, 207, respectively, on top of the VMM 240. The VMM 240 is responsible for the mapping of, and generally, the resource management of the OSs. The virtualization platform further comprises extensible firmware interface (EFI) runtime 223 and legacy runtime 225 and 227 code and data which are also known as guest BIOSes. The guest BIOSes 223, 225, 227 look like firmware interfaces 239 such that each guest OS thinks it is communicating directly with the hardware 270. Each guest OS in a VM acts as if a dedicated BIOS or EFI (223, 225, and 227) exists as if the guest OS were the only OS executing on the platform.

The VMM may have a subset of the BIOS which is exposed to the guest OS. The VMM may expose a set of firmware services, such as the EFI Runtime Services, to the OS guest. Some services, such as the ResetSystem( ) call, may be implemented differently for use by the OS guest (e.g., fault into the VMM via a VM_Call instruction, whereas the standard BIOS ResetSystem( ) which is used by the main BIOS prior to the VMM launch may initiate an actual, hardware-based reset via programmatic access to the 0×CF9 Register in the chipset). It may appear to a guest OS running legacy BIOS that the guest OS is capable of executing an int13 or int10 system call (legacy BIOS functions) as if an actual BIOS was dedicated to the OS. The actual calls may be resolved within the VMM 240 or they may be resolved in the guest BIOS 223, 225, and 227. It appears to the guest OS that the guest OS communicates directly to the hardware via the guest OS BIOS.

In existing systems, platform firmware subscribes to a standard interface, or model, such as the PC/AT legacy BIOS and its "Intxx"—callable interface, the Extensible Firmware Interface (EFI) Specification 1.10, published Dec. 1, 2002 (available at http://developer.intel.com/technology/efi/main_specification.htm) and its CPU-neutral C-callable interface, or the OpenFirmware (Institute of Electrical and Electronics Engineers standard, 1275.2-1994 *IEEE Standard for Boot (Initialization Configuration) Firmware: Bus Supplement for IEEE* 1496 (*SBus*) (ISBN 1-55937-463-2)) and its Forth-based byte-code interface. A guest BIOS may be a subset of one of these standard-based firmware interfaces that communicates as if the BIOS were communicating directly to the actual platform firmware in order for other guest software to interact as it would with the actual platform.

In embodiments with device models within the VMM, the models may be shown as smaller boxes within the VMM (not shown). In one embodiment, the VMM 240 may be I/O agnostic and pass all of the I/O data transfers from a VM through directly to the hardware 270. In other embodiments, device models (not shown) exist within the VMM to enable platform I/O, as discussed above.

When a guest OS kernel 213, 215, and 217 performs a DMA buffer allocation, such as Windows® HAL_get_common_buffer call, it may use a device driver writer. In some embodiments, the guest OS "instruments" a small amount of the OS to make a virtual machine call (VM_Call) to notify the VMM that this piece of memory is allocated to hardware 270 and should not be swapped. For the current discussion, the term "instruments" means that the OS, such as Windows® XP, has modified a portion of the binary (or source, if desired) to replace a hardware-based call into a software VM_Call. VM_Call transitions execution to the VMM from OS-hosted VM, i.e., a context switch, such that the VMM can effect the desired behavior. The guest OS indicates that a piece of hardware, like a network controller or disk controller (not shown), needs to use this memory, so the VMM 240 should not reclaim the memory page. In some embodiments, a virtualization platform 250 includes hardware support for switching contexts and associating resources with hardware switches or interrupts, such as VM_Exit and VM_Call, which are available in some virtualization platforms available from Intel Corporation. Although it is possibly more difficult to implement, these context switches may be emulated in software, if the platform does not support hardware virtualization techniques.

A guest OS is typically in control of its device drivers. In one embodiment, the VMM passes on the device requests, without observing device operations. In other embodiments, the VMM includes device models which translate a virtualized hardware layer/interface from the OS to the actual hardware/device drivers. With virtualized hardware, the VMM may keep its own DMA area, i.e., a memory bucket for device interaction. The VMM may maintain the bucket of memory for DMA and maintain a look up table.

Another embodiment of the present invention uses a pinning method, but the guest OS must notify the VMM of non-swappable memory. For example, if a new piece of hardware is deployed and the VMM has been deployed for some period of time, the VMM may not know how to communicate with the new hardware. In this instance, the guest OS needs to notify the VMM and identify the DMA area of memory for the new hardware as non-swappable.

The device drivers may communicate with the guest OS. In this case, it is unimportant to the device drivers whether or not the OS is VMM-aware. The VMM may have a device model. Device modeling may be desirable because it would be inefficient to have to interface with every possible device driver. In some embodiments, when the device drivers operate with the guest OS, the guest OS may perform a VM_Call to initiate the DMA access. Once the VM_Call is initiated, control transfers to the VMM which performs the DMA access and may emulate the hardware with a device model.

In an embodiment, the VMM invokes the guest OS and passes a data structure, or uses another method, to inform the guest OS what memory is available to the guest OS. The VMM must satisfy any OS requests for memory. If the guest OS is told that the guest OS has access to memory in the address range between 0 and 128 MB, the VMM must make sure that the guest OS can use all memory when needed.

In some embodiments, the VMM virtualizes the hardware layer. Arbitrary pages of memory may be used for device DMA. The VMM 240 may have hardware support for the actual hardware 270 on the platform. The VMM may provide input/output (I/O) and command status registers for a prototypical piece of hardware.

The device driver corresponding to a guest OS initiates access to a virtual DMA and the VMM translates that to the real hardware and memory locations based on the prototypical model. The VMM may copy data from the actual DMA buffer to the virtual DMA buffer that is known by the guest OS.

A VM may be configurable with settings/configurations/parameters 245 that may be selected using a management console 290. The VMM is parameterized in policies. The remote console 290 may have a Command Line Interface (CLI) which enables an operator/administrator to change policies, e.g. configuration parameters 245. The platform owner typically administers the VMM 240. The guests 213, 215, 217 are simply users. The owner may have special privileges. The owner may want the best performance for one VM, or overall. An example of a desired policy is to keep Linux memory from being paged out, but to allow Windows® memory to be paged. Another possible desired policy is to select a specific key for encrypting the page files, or to select a modified least recently used (LRU) algorithm for paging.

Policies/configurations may be set using a local setup procedure or a network based setup. It will be apparent to one of ordinary skill in the art that the CLI console 290 may communicate with the VMM 240 using a variety of methods, including extensible Markup Language (XML), simple object access protocol (SOAP) and others.

In an embodiment, there may be a single processor executing a plurality of VMs. The VMM controls which VM runs at any time. In one embodiment, a round robin technique may be used. Policies regarding how to control the VM time slices may be part of the parameters configured by the CLI console.

Examples of configurable settings are: a VM save file encryption key; a policy for scheduling VMs, for instance, how long to run each VM before switching to the next one; and selection of an algorithm to be used to reap or reclaim a page of memory. In one example, the platform owner has an affinity to allow Windows® XP to have priority over Linux. The CLI console may enable the owner to specify this preference as a configuration setting.

VM memory save file 243 comprises the page file used for swapping memory pages. The save file, may be on the platform hard disk. Any non-volatile memory which is communicatively coupled with the VMM may be viable for use as the memory save file. The memory reaper with encryption/compression 241 comprises the algorithm/agent used to swap memory to the memory save file. It is the virtualized virtual memory algorithm used in this example.

Figure 3:
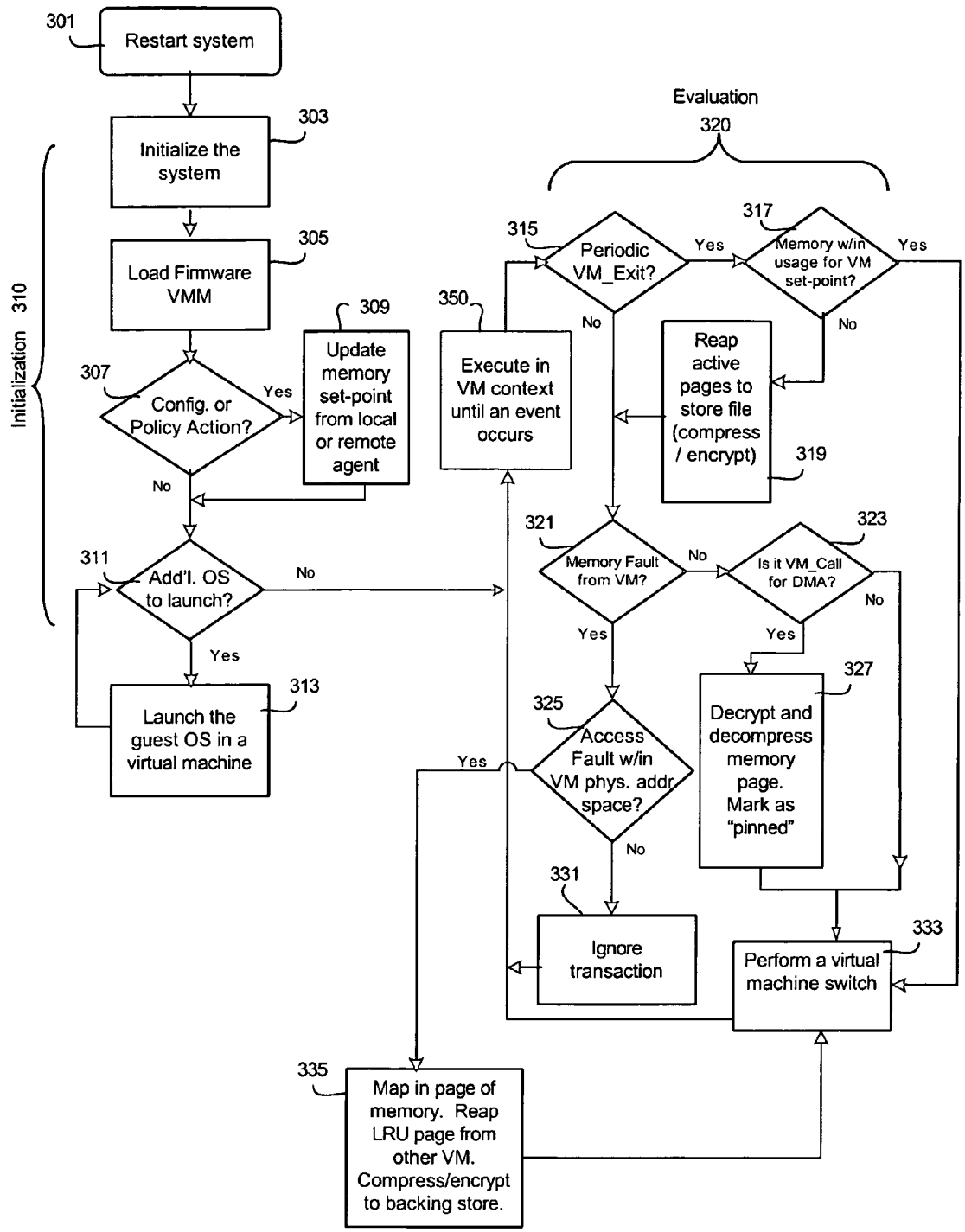
FIG. 3 is a flow diagram illustrating an exemplary method for virtualizing memory in a virtual machine platform, according to an embodiment of the invention.

Referring now to FIG. 3, there is shown a flow diagram illustrating an exemplary method for virtualizing memory in a virtual machine platform, according to an embodiment of the invention. An initialization phase 310 is shown on the left. In one embodiment, the platform is booted with a physical restart in block 301. This boot is typically a remote reset, or power on. The restart 301 is a reset of the type that will cause the platform firmware to execute its instructions. The system is then initialized in 303. This initialization includes programming the memory controller to make the dynamic random access memory (DRAM) accessible and usable, testing memory, enumerating the I/O buses, and other standard platform initialization. The VMM is then loaded in block 305. The VMM may be encapsulated in an EFI driver, or it may be loaded directly from the platform disk, flash or other storage device which is accessible in the pre-OS firmware operational environment.

In block 307 a determination is made as to whether a configuration or policy action is requested/exists. For instance, a configuration policy may be to update the memory set-point in block 309. The set-point may be that the system administrator for each VM tries to make a certain amount of memory available. The configuration may occur prior to OS boot. It may also be possible to perform some configuration modifications after OS boot.

For each OS launch as determined in block 311, an OS is launched in a VM in block 313. In the example shown in FIG. 2, Windows® XP 213 is launched in VM 203; Windows® 95 215 is launched in VM 205; and then Linux 217 is launched in VM 207. A memory map from 0 to some defined address is prepared with a resource list for each OS 203, 205, and 207. In one embodiment, a VM_Enter call may be performed for each OS to prepare a VM environment for each OS. At this point, the VMs are populated and running under the VMM.

The evaluation phase 320 is shown on the right of FIG. 3. Under normal conditions, a VM will execute in VM mode until some event causes a switch to VMM mode, or context. Until this event occurs, a VM executes at block 350. When a context switch occurs, the VMM takes control. FIG. 3 illustrates an exemplary process for virtualization of memory by a VMM, but does not attempt to show other processes which may occur upon switching context to the VMM mode. Once the context switch occurs, control passes to block 315.

A timer may be set up to schedule a VM_Exit at a periodic specific time in order to effect automatic periodic memory swapping and reallocation. At block 315, a determination is made as to whether a periodic VM_Exit is set. If so, then a check is performed to see if the memory is within the usage for a VM set-point in block 317. If so, then a virtual machine switch is performed in block 333 to switch back to the VM context, and control passes back to 350.

If memory is not within the set-point parameters, then, a VM may have too much memory allocated for the session. If the VM has too much memory, at least in comparison to the other VMs, then active pages may be reaped from the VM and stored in the store file after compression and/or encryption, in block 319.

If the context switch was not caused by a periodic VM_Exit, then there may have been a memory fault, as determined in block 321. If so, then it is then determined whether the fault is accessed within the VM physical address space in block 325. In other words, it is determined whether memory in the physical address space is accessed, but the VM does not have its own memory there—it had been swapped out. At this point, perhaps the address space access was to a memory-mapped I/O region where there are no peripherals or some other artifact that the VMM does not manage.

If memory in the physical address space was not accessed, then the transaction is ignored at block 331. If physical memory has been faulted, then it is necessary to recover memory from another VM. In this event, the memory page is mapped in block 335. In addition, the least recently used (LRU), or other preferred method, is used to reap pages from another VM. The reaped pages are compressed and encrypted and stored in the store file. A virtual machine switch is then performed in block 333 to switch the context back to the VM.

If there was not a memory fault while executing a VM and a periodic VM_Exit did not occur, as determined in block 321, then a determination is made as to whether the context switch is due to a VM_Call for direct memory access (DMA)

in block 323. If so, then the memory page is decrypted and decompressed and marked as "pinned" by the VMM so it will not be swapped out, in block 327. If the context switch is not caused by a DMA, then processing continues at 333. A context switch is performed in block 333 and control is transferred back to block 350. In other words, the VMM has control in order to manage virtual memory and when this management is completed, the processor switches back to VM context.

The techniques described herein are not limited to any particular hardware or software configuration; they may find applicability in any computing, consumer electronics, or processing environment. The techniques may be implemented in hardware, firmware, software, or a combination of the two or three. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One, of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for managing virtual memory in a virtualization platform, comprising:
   launching at least one guest operating system (OS) in a virtual machine (VM), wherein memory used by the VM is virtual memory assigned and managed by a virtual machine monitor (VMM) in a 2-stage memory abstraction, wherein it appears to the at least one guest OS that assigned memory begins at address zero, and wherein the VMM maps a virtual memory address to a physical memory address in the assigned memory;
   the VMM creating a virtual range of memory larger than an amount of physical memory in the platform, wherein when a VM attempts access to a region of memory where there is not a physical backing page of memory, the VMM using a non-volatile memory store to provide an area to page memory to/from the VM;
   determining, by the VMM, if a first VM requires a change in memory allocation; and
   if the first VM requires additional allocated memory, then the VMM allocating pages of memory to the first VM, the allocated pages comprising unused or reclaimed pages of memory, but if the first VM has excess memory, then reclaiming pages of memory from the first VM, by the VMM, and storing the reclaimed pages in the non-volatile memory store for later use by the VM, wherein memory allocation is performed dynamically at runtime,
   wherein reclaiming pages of memory further comprises:
   determining whether the memory of a VM includes at least one of unused memory and infrequently used memory, and
   reclaiming the memory determined to be unused or infrequently used;
   wherein selected memory required by a guest OS in a VM is pinned by the VMM based on a processor context switch indicating a direct memory access (DMA) attempt by the VM, and wherein pinning of memory results in the memory being prohibited from being reallocated, reclaimed or page swapped.

2. The method as recited in claim 1, wherein allocating pages of memory to the first VM comprises:
   determining, by the VMM, whether sufficient memory is available in the non-volatile memory store;
   reclaiming memory from one of the non-volatile memory store and a second VM, wherein reclaiming memory from the second VM further comprises:
      determining, by the VMM, whether the memory allocated to the second VM includes at least of unused memory and infrequently used memory, and
      reclaiming, by the VMM, the memory determined to be unused or infrequently used; and
   allocating the reclaimed memory to the first VM, by the VMM.

3. The method as recited in claim 2, wherein reclaiming memory from the second VM comprises:
   reclaiming, by the VMM, memory from the second VM; and
   allocating, by the VMM, the reclaimed memory to the first VM.

4. The method as recited in claim 3, wherein storing the reclaimed pages in a non-volatile memory store is performed before the allocating.

5. The method as recited in claim 1, wherein the memory stored in the non-volatile memory store is encrypted.

6. The method as recited in claim 1, wherein reclaiming excess memory further comprises automatically reallocating the reclaimed memory, by the VMM, to at least one other VM.

7. The method as recited in claim 1, wherein memory is allocated based on configuration settings.

8. The method as recited in claim 7, further comprising receiving the configuration settings from a command line interface (CLI) console.

9. The method as recited in claim 1, wherein the memory stored in the non-volatile memory store is compressed.

10. A virtualization platform, comprising:
a processor capable of running a plurality operating systems (OSs) in a corresponding plurality of virtual machines (VMs);
a virtual machine monitor (VMM) executing on the processor, wherein the VMM manages and controls execution of the plurality of VMs, and wherein the VMM dynamically allocates virtual memory to the plurality of VMs; and
a 2-stage memory abstraction memory management module in the VMM to reclaim pages of allocated memory, the memory module to map a virtual memory address to a physical memory address in the allocated memory, wherein selected memory required by a guest OS in a VM is pinned by the VMM based on a processor context switch indicating a direct memory access (DMA) attempt by the VM, and wherein pinning of memory results in the memory being prohibited from being reallocated, reclaimed or page swapped, and
wherein the memory management module is to reclaim both unused and infrequently used memory.

11. The virtualization platform as recited in clam 10, further comprising a store file in a non-volatile memory store to store pages of reclaimed memory.

12. The virtualization platform as recited in claim 11, wherein memory pages stored in the store file are encrypted.

13. The virtualization platform as recited in claim 11, wherein memory pages stored in the store file are compressed.

14. The virtualization platform as recited in claim 10, wherein memory allocations are based on configuration settings.

15. The virtualization platform as recited in claim 14, wherein configuration settings are received from an operator at a command line interface (CLI) console.

16. The virtualization platform as recited in claim 10, wherein the VMs utilize a hardware virtualization layer for communication with the device drivers and corresponding hardware.

17. The virtualization platform as recited in claim 10, wherein the VMM utilizes device models for OS communication with hardware.

18. The virtualization platform as recited in clam 10, wherein the plurality of VMs communicate directly to hardware using device drivers, wherein the device drivers use direct memory access (DMA) buffers, and wherein the memory management module is prevented from reclaiming memory comprising a DMA buffer used by a device driver.

19. A method for managing virtual memory in a virtualization platform, comprising:
allocating virtual memory, by a virtual machine monitor (VMM), to a plurality of virtual machines (VMs) running on a virtualization platform;
identifying, by the VMM, non-pageable memory requiring direct memory access (DMA), by an operating system running in a VM, the identifying comprising:
causing a first processor context switch in response to a DMA attempt by the operating system,
in response to the context switch cause by the operating system, marking a page comprising the pane of memory of which access was attempted as non-swappable, by the VMM;
paging virtual memory to a store file on a non-volatile memory store, wherein the virtual machine monitor prevents paging non-pageable memory as identified by the operating system and marked by the VMM, wherein paging virtual memory to a store file on the non-volatile store further comprises:
identifying infrequently used memory assigned as in-use by an operating system in a first virtual machine, and
borrowing the infrequently used memory temporarily for use by a second virtual machine by storing the infrequently used memory in the non-volatile store and reallocating the memory to the second virtual machine.

20. The method as recited in claim 19, further comprising:
dynamically reallocating virtual memory from the store file to at least one of the plurality of virtual machines running on the virtualization platform, by the VMM.

21. The method as recited in claim 19, wherein pages stored in the store file are encrypted.

22. The method as recited in claim 19, wherein pages stored in the store file are compressed.

23. A machine accessible storage medium having instructions that when executed in a platform, cause a platform to:
allocate virtual memory to a plurality of virtual machines running on the machine, by a virtual machine monitor (VMM), the VMM creating a virtual range of memory larger than an amount of physical memory in the platform; and
page virtual memory assigned to a VM to and from a store file on a non-volatile memory store, wherein the virtual machine monitor prevents paging non-pageable memory requiring direct memory access (DMA) by an operating system and corresponding device drivers, wherein the non-pageable memory is identified to the VMM by the operating system via use of processor context switches resulting from attempting a DMA by a VM, wherein paging virtual memory to a store file on the non-volatile store further comprises instructions to:
identify infrequently used memory assigned as in-use by an operating system in a first virtual machine, and borrow the infrequently used memory temporarily for use by a second virtual machine by storing the infrequently used memory in the non-volatile store and reallocating the memory to the second virtual machine.

24. The machine accessible storage medium as recited in claim 23, further causing the machine to:
dynamically reallocate virtual memory from the store file to at least one of the plurality of virtual machines running on the platform, by the VMM.

25. The machine accessible storage medium as recited in claim 23, wherein pages stored in the store file are encrypted.

26. The machine accessible storage medium as recited in claim 23, wherein pages stored in the store file are compressed.

27. A machine accessible storage medium containing instructions that when executed on a machine, cause the machine to:

launch at least one guest operating system (OS) in a virtual machine (VM), wherein memory used by the VM is virtual memory assigned and managed by a virtual machine monitor (VMM), in a 2-stage memory abstraction, wherein it appears to the at least one guest OS that assigned memory begins at address zero, and wherein the VMM maps a virtual memory address to a physical memory address in the assigned memory;

create, by the VMM, a virtual range of memory larger than an amount of physical memory in the platform, wherein when a VM attempts access to a region of memory where there is not a physical backing page of memory, the VMM using a non-volatile memory store to provide an area to page memory to/from the VM;

determine, by the VMM, if a first VM requires a change in memory allocation; and if the first VM requires additional allocated memory, then the VMM to allocate pages of memory to the first VM, the allocated pages comprising unused or reclaimed pages of memory, but if the first VM has excess memory, then reclaim pages of memory from the first VM, by the VMM, and store the reclaimed pages in the non-volatile memory store for later use by the VM, wherein excess memory comprises at least one of unused memory and infrequently used memory, where both unused memory and infrequently used memory are to be reclaimed, and wherein memory allocation is performed dynamically at runtime;

wherein selected memory required by a guest OS in a VM is pinned by the VMM based on a processor context switch indicating a direct memory access (DMA) attempt by the VM, and wherein pinning of memory results in the memory being prohibited from being reallocated, reclaimed or pare swapped.

28. The machine accessible storage medium as recited in claim 27, wherein allocating pages of memory to the first VM further causes the machine to:

determine, by the VMM, whether sufficient memory is available in the non-volatile memory store;

reclaim memory from one of the non-volatile memory store and a second VM, wherein reclaiming memory from the second VM comprises instructions that cause the machine to:

determine, by the VMM, whether the second VM has excess memory, then reclaim, by the VMM, pages of the determined excess memory from the second VM, and store the reclaimed pages in the non-volatile memory store, wherein excess memory comprises at least one of unused memory and infrequently used memory, where both unused memory and infrequently used memory are to be reclaimed; and allocate the reclaimed memory to the first VM, by the VMM.

* * * * *